(12) United States Patent
Marsico (10) Patent No.: US 9,223,885 B2
(45) Date of Patent: Dec. 29, 2015

(54) METHODS AND SYSTEMS FOR SURVEYING A USER WITH SCAN-ABLE CODES

(75) Inventor: Peter Joseph Marsico, Chapel Hill, NC (US)

(73) Assignee: FLASHBACK SURVERY, INC., Chapel Hill, NC (US)

( * ) Notice: Subject to any disclaimer, the term of this patent is extended or adjusted under 35 U.S.C. 154(b) by 144 days.

(21) Appl. No.: 13/573,110

(22) Filed: Aug. 22, 2012

(65) Prior Publication Data

US 2013/0048710 A1  Feb. 28, 2013

Related U.S. Application Data

(60) Provisional application No. 61/575,603, filed on Aug. 24, 2011, provisional application No. 61/634,497, filed on Mar. 1, 2012.

(51) Int. Cl.
   *G06F 17/00* (2006.01)
   *G06F 17/30* (2006.01)

(52) U.S. Cl.
   CPC .............................. *G06F 17/30879* (2013.01)

(58) Field of Classification Search
   USPC ................... 235/375, 379, 380, 449, 462, 472
   See application file for complete search history.

(56) References Cited

U.S. PATENT DOCUMENTS

| | | | |
|---|---|---|---|
| 6,633,223 B1 * | 10/2003 | Schenker et al. | ............ 340/5.53 |
| 2004/0078218 A1 | 4/2004 | Badinelli | |
| 2007/0187266 A1 | 8/2007 | Porter et al. | |
| 2008/0312966 A1 | 12/2008 | Meshginpoosh | |
| 2009/0106085 A1 * | 4/2009 | Raimbeault | .......... G06Q 20/208 |
| | | | 705/14.44 |
| 2009/0150215 A1 * | 6/2009 | Kalb et al. | ...................... 705/10 |
| 2010/0185465 A1 | 7/2010 | Rana et al. | |

(Continued)

FOREIGN PATENT DOCUMENTS

| WO | WO 2013/126886 A1 | 8/2013 |
|---|---|---|
| WO | WO 2015/035055 A1 | 3/2015 |

(Continued)

OTHER PUBLICATIONS

Notification of Transmittal of the International Search Report and the Written Opinion of the International Searching Authority, or the Declaration for International Application No. PCT/US14/55675 (Dec. 24, 2014).

(Continued)

*Primary Examiner* — Michael G Lee
*Assistant Examiner* — Tabitha Chedekel
(74) *Attorney, Agent, or Firm* — Jenkins, Wilson, Taylor & Hunt, P.A.

(57) ABSTRACT

Disclosed are methods, systems and computer program products for surveying a user using a scan-able information encoded graphic image, such as a bar code or a quick response (QR) code. In one embodiment, a mobile communication device such as a smartphone, tablet computer or other mobile computer is adapted to include a survey client module for scanning and communicating QR code information. QR code scanning is accomplished by a camera module that is associated with the smartphone or other mobile computing device. The survey client module communicates the scanned QR code information to an associated server application for collecting, processing and reporting survey data. The information encoded in the QR code includes information that is sufficient to identify a client entity (e.g., a local retailer or merchant) and a survey response.

21 Claims, 9 Drawing Sheets

(56) References Cited

U.S. PATENT DOCUMENTS

| | | | |
|---|---|---|---|
| 2011/0071843 A1* | 3/2011 | Gilvar et al. | 705/1.1 |
| 2012/0084120 A1* | 4/2012 | Hirsch | G06Q 30/02 705/7.32 |
| 2012/0095796 A1* | 4/2012 | Gately | G06Q 10/06311 705/7.13 |
| 2012/0209686 A1* | 8/2012 | Horowitz et al. | 705/14.26 |
| 2012/0253828 A1 | 10/2012 | Bellacicco, Jr. | |
| 2013/0080262 A1 | 3/2013 | Scott | |
| 2013/0175334 A1 | 7/2013 | Miller | |
| 2013/0187926 A1 | 7/2013 | Silverstein et al. | |
| 2013/0191180 A1 | 7/2013 | Teo et al. | |
| 2013/0238360 A1 | 9/2013 | Bhathal | |
| 2014/0136305 A1 | 5/2014 | Blumenthal | |
| 2014/0231502 A1 | 8/2014 | Marsico et al. | |
| 2015/0039409 A1 | 2/2015 | Marsico et al. | |
| 2015/0170164 A1 | 6/2015 | Marsico | |

FOREIGN PATENT DOCUMENTS

| | | | |
|---|---|---|---|
| WO | WO 2015/039025 A1 | 3/2015 | |
| WO | WO 2015/041985 A1 | 3/2015 | |

OTHER PUBLICATIONS

Commonly-assigned, co-pending U.S. Appl. No. 14/570,804 for "Methods and Systems for Using Scanable Codes to Obtain a Service," (Unpublished, filed Dec. 15, 2014).

Notification of Transmittal of the International Search Report and the Written Opinion of the International Searching Authority, or the Declaration for International Application No. PCT/US14/54103 (Dec. 12, 2014).

Notification of Transmittal of the International Search Report and the Written Opinion of the International Searching Authority, or the Declaration for International Application No. PCT/US14/55644 (Dec. 8, 2014).

Non-Final Office Action for U.S. Appl. No. 14/185,488 (Sep. 12, 2014).

Commonly-assigned, co-pending U.S. Appl. No. 14/328,654 for "Methods and Systems for Providing Scan Triggered Application Services," (Unpublished, filed Jul. 10, 2014).

Final Office Action for U.S. Appl. No. 14/185,488 (Jul. 16, 2015).

Commonly-assigned, co-pending U.S. Appl. No. 14/789,594 for "Methods and Systems for Using Scanable Codes to Obtain Maintenance and Reminder Services," (Unpublished, filed Jul. 1, 2015).

Commonly-assigned, co-pending U.S. Appl. No. 14/719,292 for "Methods and Systems for Providing Scan-Triggered Health Care Instruction and Reminder Services," (Unpublished, filed May 21, 2015).

Commonly-assigned, co-pending U.S. Appl. No. 62/011,750 for "Methods and Systems for Providing Scan-Triggered Services," (Unpublished, filed Jun. 13, 2014).

Commonly-assigned, co-pending U.S. Appl. No. 62/001,673 for "Methods and Systems for Providing Scan Triggered Services," (Unpublished, filed May 22, 2014).

Commonly-assigned, co-pending U.S. Appl. No. 61/961,298 for "Methods and Systems for Using Scan-able Codes to Obtain a Service," (Unpublished, filed Oct. 10, 2013).

* cited by examiner

Table 1

| UserID* (340) | User Name (342) | City (344) | State (346) | Zip (348) | Country (350) | Permission To Send Follow-up Surveys? (352) | Permission to Provide Geo-Location Info? (354) |
|---|---|---|---|---|---|---|---|
| 3245324 | Joe Smith | Chapel Hill | NC | 27516 | US | Yes | Yes |

Table 2

| ClientID* (440) | Client Name (442) | City (444) | State (446) | Zip (448) | Country (450) | Geo-Location Coords (452) | Service Plan (454) |
|---|---|---|---|---|---|---|---|
| 001 | Luigi's Pizzeria | Chapel Hill | NC | 27516 | US | Lat, Long, Elev | Merchant_Tier1 |

Table 3

| RewardID* (380) | ClientID (382) | Description (384) | Distribution Start Date (386) | Distribution Stop Date (388) | Distribution Trigger (390) |
|---|---|---|---|---|---|
| 34532433 | 001 | $2 Off | 8/1/2011 | 9/1/2011 | QR Code: 001*** |
| 76782433 | 001 | 10% Off | Forever | Forever | Follow-up Survey ResponseOptionID: 001*** |

Figure 3

Table 4

| QR Code* (300) | ClientID (302) | Location Type (304) | QR Code Descriptor (306) | Follow-up Survey ID (308) |
|---|---|---|---|---|
| 001111 | 001 | Fixed | "Poor Service" | 001344 |
| 001112 | 001 | Fixed | "Good Service" | 001565 |

Table 5

| Follow-up Survey ID* (320) | Follow-up Survey Descriptor (322) |
|---|---|
| 001344 | "How Was The Service Poor?" |
| 001564 | "What Was Your Waiter's Name?" |
| 001565 | "What Part Of The Service Was Slow?" |

Table 6

| Follow-up Survey ID* (330) | ResponseOptionID (332) | ResponseOption Descriptor (334) | Follow-up Survey ID (336) |
|---|---|---|---|
| 001344 | 01 | "Waiter Was Rude" | 001564 |
| 001344 | 02 | "Long Wait To Be Seated" | 001566 |
| 001344 | 03 | "Service Was Slow" | 001565 |
| 001564 | 01 | "Peter" | |
| 001564 | 02 | "Kevin" | |
| 001564 | 03 | "Paul" | |
| 001565 | 01 | "Long Wait To Have Order Taken" | |
| 001565 | 02 | "Long Wait For Food To Arrive" | |

| UserID* (360) | Reward ID (362) | Associated Transaction ID (364) | Expiration Date (366) | Redemption Date (368) | Redemption Code (370) |
|---|---|---|---|---|---|
| 3245324 | 34532433 | d254c546873 | 10/2/2012 | 8/8/2011 | 22354546 |

Table 9

METHODS AND SYSTEMS FOR SURVEYING A USER WITH SCAN-ABLE CODES

PRIORITY CLAIM

This application claims the benefit of U.S. Provisional Patent Application Ser. No. 61/575,603, filed Aug. 24, 2011 and U.S. Provisional Patent Application Ser. No. 61/634,497, filed Mar. 1, 2012; the disclosures of which are incorporated herein by reference in their entirety.

TECHNICAL FIELD

The subject matter described herein relates to methods and systems for collecting feedback or surveying a user using scan-able codes.

BACKGROUND OF THE INVENTION

Information collection systems that are typically deployed to gather information from a consumer of goods and services are often intrusive and time consuming from the perspective of the consumer. Such information collection systems often require the consumer to access a WEB site that presents the consumer with a series of questions to be completed. While such information collection systems are capable of gathering detailed feedback information from a consumer, the time and effort required to provide the requested feedback information is such that many consumers chose not to participate.

In light of these problems, what is needed is a system and method for efficiently and conveniently collecting feedback or surveying a user.

SUMMARY OF THE INVENTION

According to one aspect, the present invention includes systems and methods for surveying a user using a scan-able information encoded graphic image, such as a bar code or a quick response (QR) code. In one embodiment, a mobile communication device such as a smartphone, tablet computer or other mobile computer is adapted to include a survey client module for scanning and communicating QR code information. QR code scanning is accomplished by a camera module that is associated with the smartphone or other mobile computing device. The survey client module communicates the scanned QR code information to an associated server application for collecting, processing and reporting survey data. In one embodiment, the information contained in the scanned QR code is decoded by the survey client module and communicated to the associated server application. The information encoded in the QR code includes information that is sufficient to identify a client entity (e.g., a local retailer or merchant) and a survey response. The server application is adapted to receive the information sent by the survey client module and to store, analyze and generate reports based on the information.

In another embodiment, an image (e.g., JPEG, bitmap, etc.) of the scanned QR code icon is provided by the survey client module to the associated server application. In this case, the server application is adapted to decode the information encoded in the QR code, and to subsequently store, analyze and generate reports based on the information.

According to another aspect, the present invention includes systems and methods for providing enhanced user survey data collection capability. In one embodiment, the survey client module communicates the scanned QR code information to an associated server application residing on a cloud-hosted application server, where the information encoded in the QR code includes information that is sufficient to identify a client entity and a survey response. The server application responds to the survey client module with a follow-up survey solicitation, where the follow-up survey solicitation is based, at least in part, on the scanned QR code information received from the survey client module.

According to another aspect, the present invention includes systems and methods for distributing and redeeming a survey participation reward voucher to a survey respondent. In one embodiment, survey participation reward voucher content information (e.g., text which describes the reward voucher, a graphic image associated with the reward voucher, etc.) is communicated from the server application to the survey client module. At least a portion of the survey participation reward voucher content information is displayed to the user associated with the mobile communication device. The user may select the survey participation reward voucher for redemption. In response to selecting the survey participation reward voucher for redemption, the survey client module prompts the user to scan a scan-able graphic icon (e.g., QR code) associated with a client entity. The information encoded in the QR code includes information that is sufficient to identify the client entity. At least a portion of the scanned QR code information, as well as information which is sufficient to identify the selected survey participation reward voucher is communicated by the survey client module to the server application. In response to receiving this information, the server application records that the survey participation reward voucher has been redeemed and communicates a redemption or authorization code to the survey client software module. The redemption or authorization code may be provided to the client entity with which the survey participation reward voucher is being redeemed so as to provide evidence that the survey participation reward voucher is considered to be redeemed by the server application.

The subject matter described herein for facilitating scan code-based user surveying may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer perform steps. Exemplary computer readable media suitable for implementing the subject matter described herein include disk memory devices, programmable logic devices, application specific integrated circuits, and downloadable electrical signals. In addition, a computer readable medium that implements the subject matter described herein may be located on a single device or computing platform distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
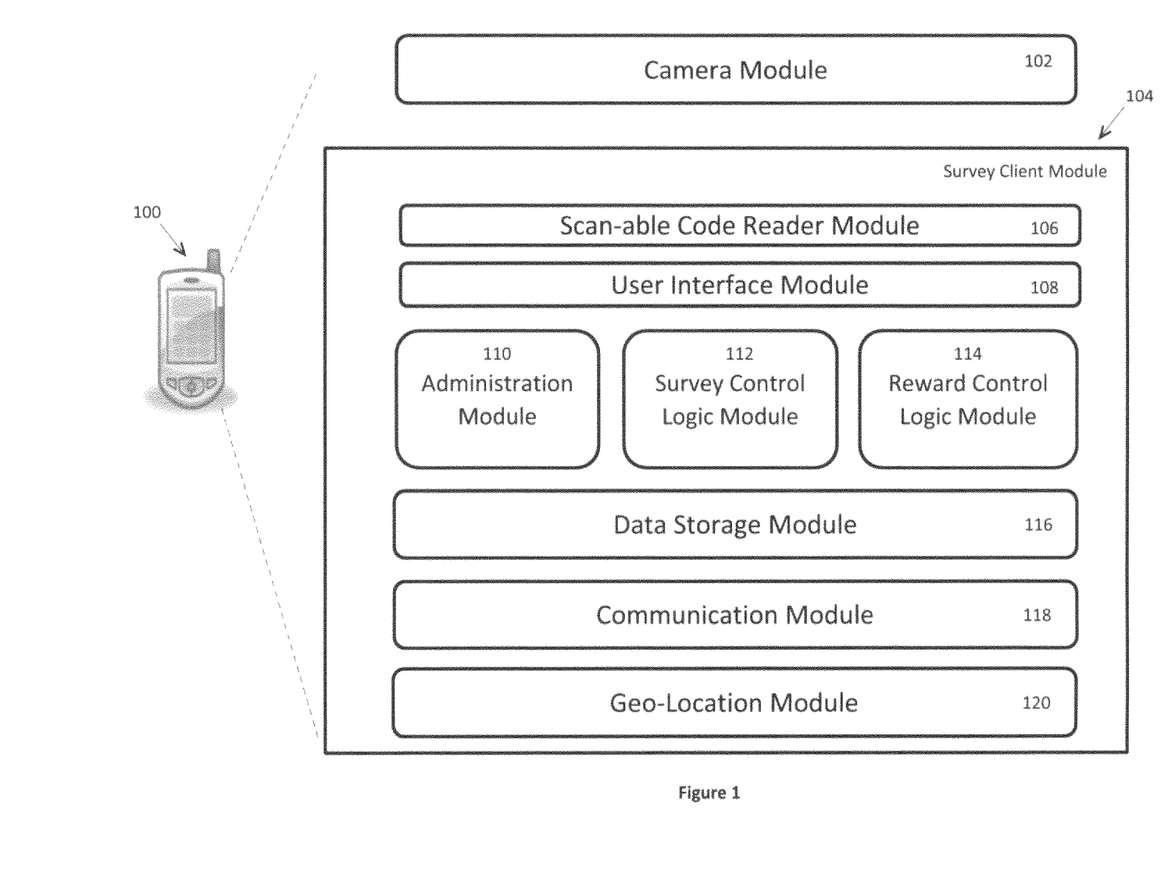
FIG. 1 is a functional block diagram which illustrates a mobile communication device that includes a camera and exemplary survey client module.

Disclosed are systems and methods for collecting survey information from a user with regard to a good or service provided by a client entity (e.g., retailer, merchant, corporation, etc.), and for processing and reporting the collected survey information to the client entity. In a preferred embodiment, the present invention includes a survey client module, which may be implemented in hardware, software, firmware or a combination thereof and which resides on a mobile communication device, such as a smartphone, tablet computer, netbook computer, or other mobile computing device. The survey client module may include an executable computer program (e.g., C++, Java, etc.) that is adapted to be downloaded onto the mobile communication device, installed and executed. The survey client module may also include a WEB browser that is adapted to access and execute WEB-based software (e.g., Java Applet, etc.) that provides a least a portion of the necessary survey client functionality. Shown in FIG. 1 is a block diagram that illustrates an exemplary architecture of a smartphone-based survey client module. Smartphone 100 includes a camera module 102 that is adapted to capture and store an image in a digital format. Smartphone 100 also includes a survey client module 104. Survey client module 104 is comprised of scan code reader module 106, a user interface module 108, an administration module 110, a survey control logic module 112, a survey participation reward control logic module 114, a data storage module 116, and a communication module 118.

In one embodiment, scan code reader module 106 is adapted to receive digital image information associated with a photographed scan code icon, such as a quick response (QR) code, bar code, or other graphic encoding format. Reader module 106 analyzes and decodes or extracts digital information encoded within the scan code icon image. The extracted information may comprise information that is representative, for example, of an alphanumeric text string, a numeric code. The decoded scan code information is provided to an associated server application module via communication module 118. In an alternate embodiment, scan code reader module 106 is adapted to receive digital image information from camera module 102 and to communicate the digital image information (e.g., JPEG) to an associated server application module via communication module 118 where decoding processing is performed.

User interface module 108 is adapted to present the mobile device user with a graphical user interface for enabling the user to generally control and operate the functionality of the survey client. User interface module 108 is adapted to present a menu structure to the user and enable the user to navigate this menu structure. The menu structure provides a user with access to administrative functions, such as account settings (e.g., username, password, service preferences, personal information, etc.), account log-in. Such administrative functions are controlled within survey client module 104 via administration module 110. The menu structure also provides the user with the ability to control the associated smartphone camera. The ability to access and operate the smartphone camera in the manner required to effectively photograph or scan a scan code icon, such as a QR code, is provided via survey control logic module 112. The menu structure also provides the user with the ability to access and redeem survey participation rewards. Survey participation reward access and redemption functionality is provided by survey participation reward control logic module 114.

Data storage module 116 is adapted to provide both long term storage of data associated with the survey client module, as well as short term, cache-type storage of survey client related data. Exemplary uses of the data storage are discussed in more detail in the disclosure that follows.

Communications module 118 is adapted to facilitate the communication of information between survey client module 104 and an associated server application module. For example, communication module 118 may receive information from survey control logic module 112 that is to be communicated to an associated server application module. Communication module 118 may package the information according to a pre-defined message format and forward the message to a data communications interface associated with the smartphone. Exemplary data communication interfaces may include, but are not limited to, a General Packet Radio Service (GPRS) interface, an Enhanced Data Rates for GSM Evolution (EDGE), High Speed Packet Access (HSPA), WiMax, WiFi, etc. For example, in one embodiment, when a user scans a survey response QR code associated with the present invention, communication module 118 is adapted to communicate to an associated server application module information that was encoded in the scanned survey response QR code as well as information that can be used to identify the user. Information that can be used to identify the user may include a user identifier (e.g., username, email address, mobile IP address, session ID, etc.). It will be appreciated that the communication of such user identifying information to the server module may be triggered upon scanning of the QR code or may be triggered upon startup of software associated with survey client module 104 (e.g., auto-login, manual login, etc.).

Geo-location module 120 is adapted to determine geo-location information indicative of the geographic position of mobile communication device 100. Geo-location information determined by module 120 may include Global Positioning System (GPS) coordinate information (e.g., latitude, longitude, elevation). Module 120 may determine this geo-location information and generally facilitate the communication of this information to an associated server application module in conjunction with the communication of scanned graphic icon (e.g., QR code) information, thereby enabling the server application module to identify and store the location at which a QR code was scanned.

Figure 2:
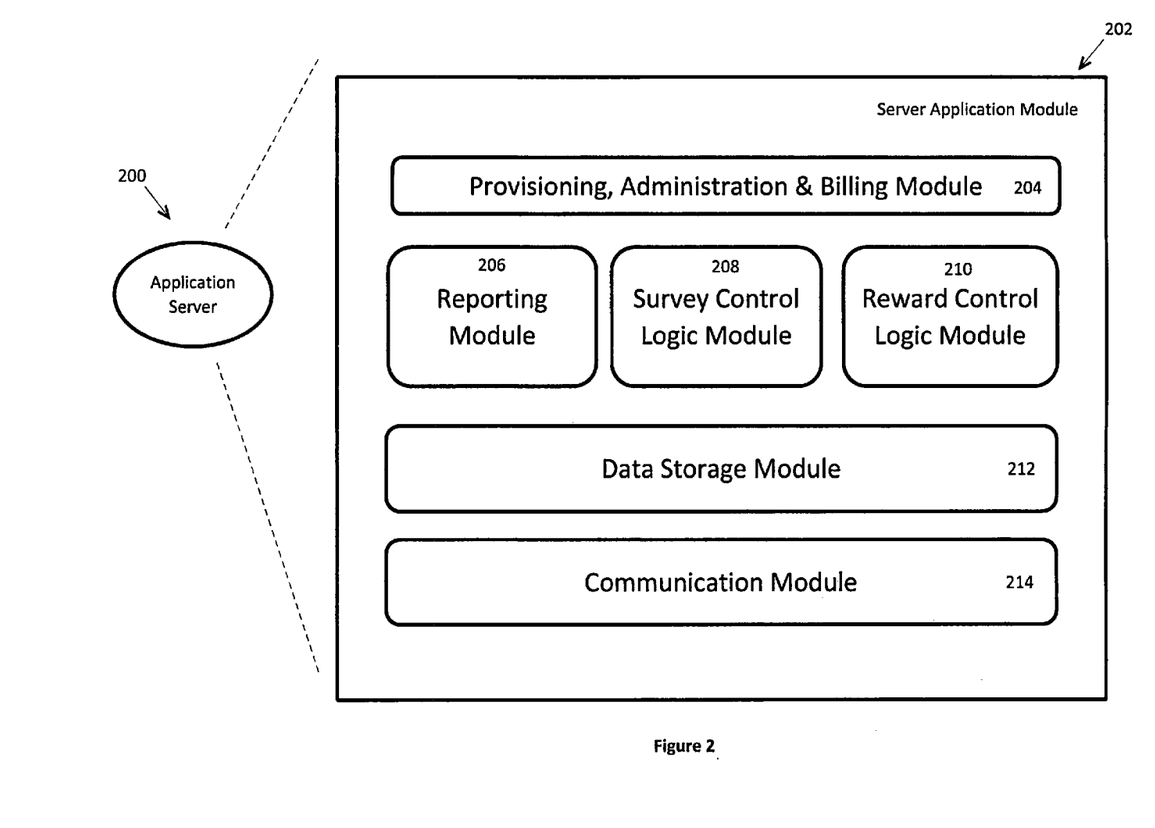
FIG. 2 is a functional block diagram which illustrates an application server that includes an exemplary server application module.

Shown in FIG. 2 is a block diagram that illustrates an exemplary architecture of a server application module 202, which resides and executes on a network or cloud-hosted application server 200. In the embodiment presented in FIG. 2, the server application module is comprised of a provisioning, administration and billing module 204, a reporting module 206, a survey logic control module 208, a survey participation reward control logic module 210, a data storage module 212, and a communication module 214.

Figure 3:
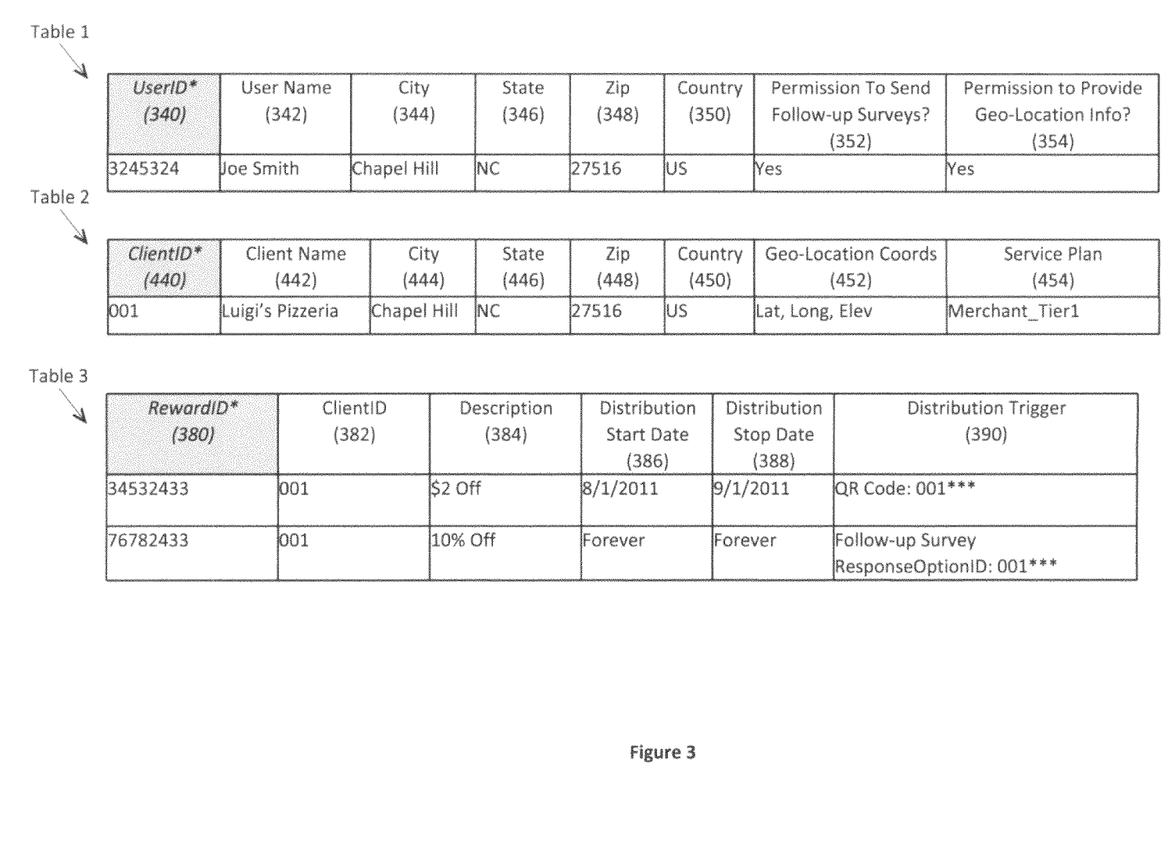
FIG. 3 is a diagram that illustrates exemplary user, client and survey participation reward provisioning data.

Provisioning, administration and billing module 204 is adapted to provide access for a user, such as a client entity, mobile user entity or a system administrator, to provision registration information, subscription configurations/preference information, survey content information, and survey participation reward content information. Exemplary user registration and configuration settings information is presented in Table 1, as shown in FIG. 3. In the context of this disclosure, a user is considered to be the operator or user of a mobile communication device (e.g., smartphone, tablet computer, etc.) that includes a survey client module, and is therefore capable of scanning a QR code (or other encoded, optically scan-able icon) and providing survey data to an associated application server. For example, a user may be a consumer of goods and services provided by a merchant, or an employee of a corporation.

Table 1 includes UserID information 340, user name information 342, user city 344, user state 346, user zip code 348, user country 350, Follow-up Survey permission information 352, and geo-location data sharing permission information 354. The user information shown in Table 1 is merely exemplary and is not intended to be comprehensive. Exemplary client registration and configuration settings information is presented in Tables 2 and 3, as shown in FIG. 3. In the context of this disclosure, a client is considered to be an entity that wishes to survey a user. For example, a client entity may be a retailer or merchant of goods and services, or a corporation that wishes to survey its employees. Table 2 includes ClientID information 440, client name information 442, client city 444, client state 446, client zip code 448, client country 450, client geo-location data 452, and service plan information 454. The client information shown in Table 2 is merely exemplary and is not intended to be comprehensive. Table 3 includes survey participation reward identification information 380, client entity identification information 382, survey participation reward description information 384, reward distribution start date information 386, reward distribution stop date information 388, and reward distribution trigger criteria information 390.

A client entity, such as a restaurant owner, may log-in to server application module 202 and, via module 204, construct or provision survey content associated with a survey of customer satisfaction with the service at the owner's restaurant. The client entity may implicitly or explicitly define a primary survey question, such as "How was the service?" In the case of an explicitly defined primary survey question, the literal question may be stored in a data structure or database associated with data storage module 212. One or more responses associated with the primary survey question are also defined and stored in data storage module 212. Exemplary responses might include, "Poor Service" and "Good Service". In one embodiment, a code is associated with each defined response to the primary survey question. As such, the code is explicitly associated with the response and implicitly associated with the primary survey question. Exemplary survey content data is presented in Table 4, shown in FIG. 4. Each exemplary survey content record in Table 4 includes a QR code identifier 300, a ClientID 302, a location type indicator 304, QR code descriptor text descriptor information 306, and follow-up survey identification information 308. It will be appreciated, in the sample data shown in Table 4, that the QR code identifier values chosen incorporate the ClientID value in the first three digits. As such, the QR code assigned to the survey response option "Poor Service" includes information that is sufficient to explicitly identify both the client entity (i.e., "Luigi's Pizzeria") with which the survey is associated and the survey response option (i.e., "Poor Service"). It will also be appreciated that, in this example, the survey question itself (i.e., "How was the service?") may be inferred from the possible survey response options that are available. Hence, in one sense, the QR code can also be thought of as including a triplet of information sufficient to identify a client entity, a survey response, and implicitly, an associated survey question.

Provisioning, administration and billing module 204 is adapted to generate an encoded scan-able graphic icon (e.g., QR code icon) associated with each possible survey response, where the information encoded in the scan-able graphic icon includes, at least, the associated response code (e.g., QR code). In an alternate embodiment, information that can be used to identify the associated client entity may be separately encoded in the scan-able graphic icon. The client entity may download and print or otherwise display these scan-able graphic icons at various locations within the restaurant so that they may be scanned by a patron/user of mobile communication device 100.

Figure 4:
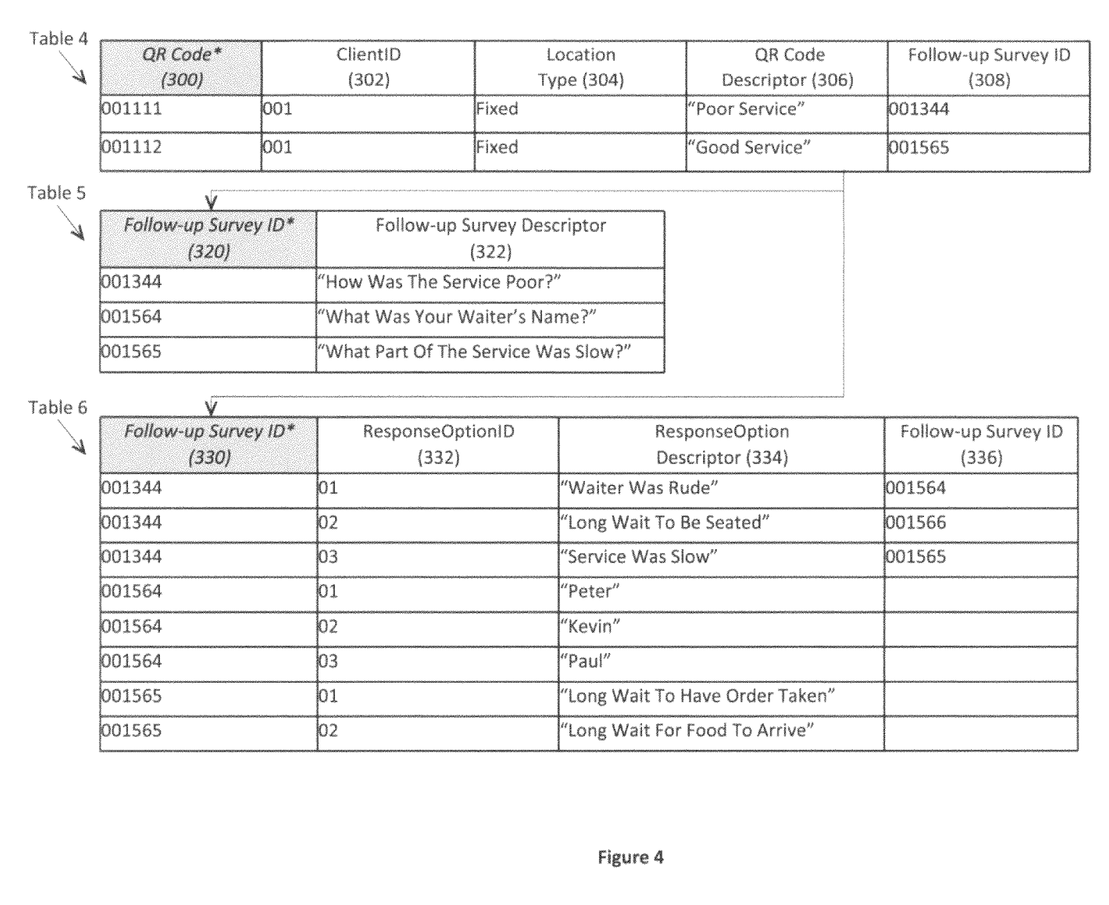
FIG. 4 is a diagram that illustrates exemplary primary and follow-up survey content data.

According to one aspect of the present invention, in response to the scanning of a scan-able graphic code (e.g., QR code) that encodes a client identifier and survey response option identifier, follow-up or "micro" survey content information may be sent to a user. Shown in FIG. 4 are Tables 5 and 6, which include exemplary follow-up survey data that may be provisioned by a client entity via module 204. Table 5 includes Follow-up survey ID information 320, and Follow-up survey descriptor information 322. Table 6 includes Follow-up survey ID information 330, ResponseOptionID information 332, ResponseOption Descriptor information 334, and optionally a pointer to another Follow-up survey 336.

Continuing with the previous survey example, if a user scans the QR code icon that encodes the value "001111" which is associated with the survey response option "Poor Service" (see Table 4, record 1), follow-up survey content is subsequently sent and displayed to the user. In this example, the follow-up survey content includes the question "How was the service poor?" and also includes three possible response options; ResponseOptionID=1: "Waiter was rude", ResponseOptionID=2: "Long wait to be seated", and ResponseOptionID=3: "Service was slow". In practice, the user may select some or all of the provided response options. The user's response option selection(s) are then communicated to the server application module where they are processed and recorded. Additional follow-up surveys may be sent to the user based on the response option(s) selected.

Reporting module 206 is adapted to provide access to survey data that has been collected as well as to survey participation reward distribution and redemption information. In one embodiment, reporting module 206 analyzes collected survey data and generates summary reports associated with the survey data. Module 206 may generate and report statistics that are based on collected survey data. Reports generated by module 206 may be viewed, for example, by a client entity via a WEB browser or other software interface. Module 206 may also provide survey, participation reward and redemption data and associated statistics in a downloadable format, such as a spreadsheet or portable document format. In one embodiment, report module 206 may enable a user to access and view user account information, including user settings, user preferences, survey participation rewards earned, survey participation reward redemption information, survey participation reward transfers to other users, etc.

According to one aspect, survey control logic module 208 is adapted: to receive and process scanned survey code (e.g., QR code) information from one or more survey client modules. Module 208 facilitates the storage of collected survey code information within an associated data storage module. In an alternate embodiment, module 208 is adapted to decode or "read" an image provided by a survey client module. The image may be, for example, a JPEG formatted graphic image of a QR code icon. The decoded information extracted from the QR code icon is then processed and stored in a manner similar to that described above. Module 208 is adapted to receive and log or record scanned survey code (e.g., QR code) information from a user. Module 208 may also access provisioned follow-up survey rules and communicate follow-up survey content to the user based on the provisioned rules. Module 208 may subsequently receive follow-up survey response information from the user, and log or record this follow-up survey response information and again access the provisioned follow-up survey rules and communicate additional follow-up survey content to the user based on the provisioned rules.

Figure 5:
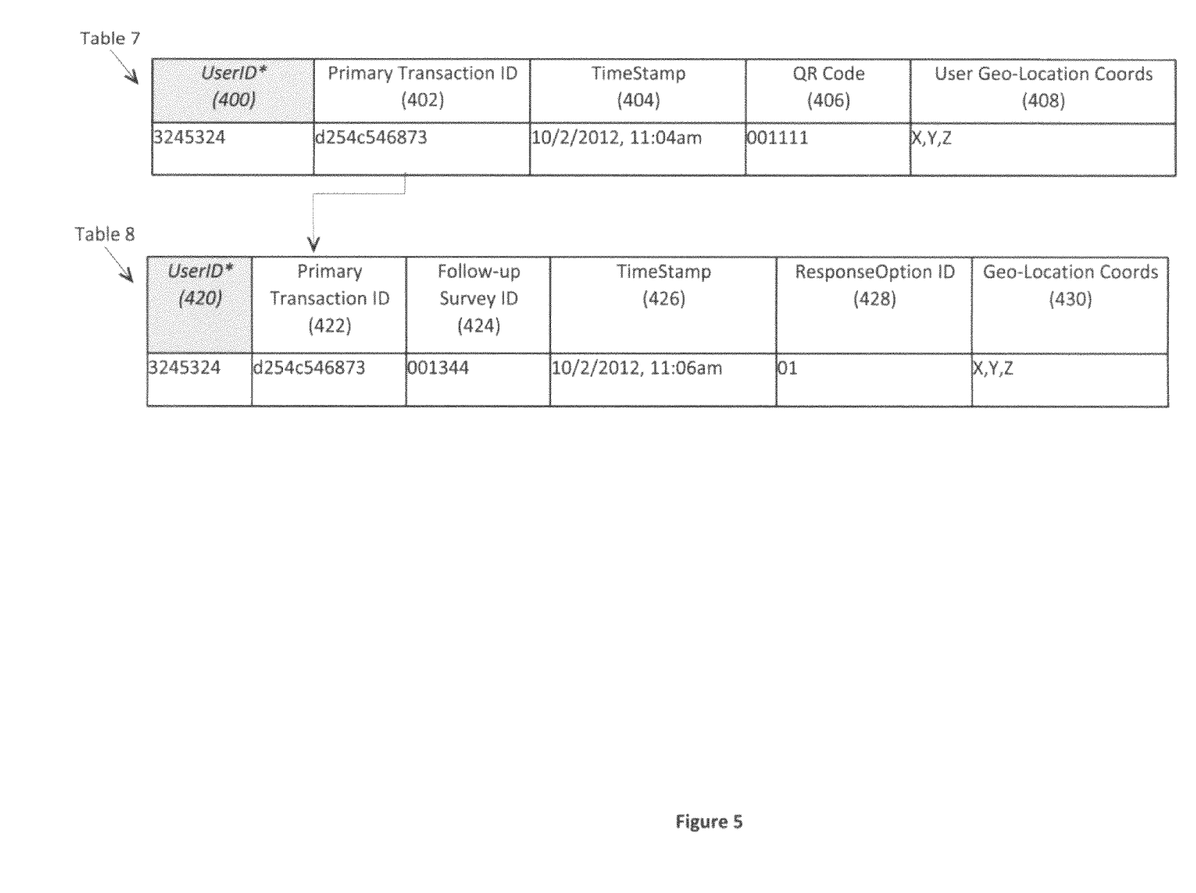
FIG. 5 is a diagram that illustrates exemplary survey response data.

Shown in FIG. 5 are Tables 7 and 8, which include exemplary survey response transaction data that is stored, for example, in data storage module 212. Table 7 includes UserID information 400, survey response transaction identifier information 402, transaction timestamp information 404, scanned survey response code (e.g., QR code) information 406, and user geo-location coordinate information at the time of the survey response transaction 408. Table 8 includes UserID information 420, survey response transaction identifier information 422, follow-up survey identification information 424, transaction timestamp information 426, follow-up survey response option identification information 428, and user geo-location coordinate information at the time of the follow-up survey response transaction 430.

Reward control logic module 210 is adapted to operate in conjunction with module 208 so as to receive or be informed of scanned survey code (e.g., QR code) and/or follow-up survey response information associated with a user/survey client module. In one embodiment, module 210 is adapted to distribute a survey participation reward, such as a coupon or voucher that may be exchanged for a good or service, to a user based on survey scan code (e.g., QR code) information received from the user or from follow-up survey response information received from the user. To determine which survey participation reward content to distribute, module 210 may access provisioned reward rules data, such as the exemplary survey participation reward data shown in Table 3.

In an alternate embodiment, module 210 is adapted to distribute survey participation reward content to a user based on criteria other than received survey scan code or follow-up survey response information. For example, module 210 may distribute reward content based on the number of survey response events or transactions initiated by a user. In one scenario, a user is sent a survey participation reward by module 210 for every 25$^{th}$ survey response event associated with the user. In another scenario, module 210 may periodically or randomly distribute reward content to a user.

Module 210 is also adapted to receive and process a request by a user/survey client module to redeem a survey participation reward. The user/survey client module requesting to redeem a survey participation reward provides information which identifies the reward to be redeemed and the redemption entity. A redemption entity is defined herein as any entity (e.g., retail merchant, corporation, etc.) that exchanges a survey participation reward for a good or service. Module 210 is adapted validate the redemption request. Validation of a redemption request may include, but is not limited to, confirming that the requesting user has been previously given the reward associated with the redemption request, confirming that the reward associated with the redemption request has not expired, confirming that the redemption entity information provided is valid, confirming that the user is in good standing.

In one embodiment, module 210 may facilitate the sharing, gifting, or transfer of a survey participation reward from one user to another user. In this case, a first user who is the current owner of a survey participation reward, selects the reward and identifies a second user to whom the reward is to be transferred. The first user then communicates information that identifies both the reward and the "transferred to" user to module 210. Module 210 receives, processes and logs the transfer request and updates the appropriate reward data so as to execute the transfer. In one embodiment, reporting module 206 enables a client entity or user to view, track and analyze such reward transfers.

Figure 6:
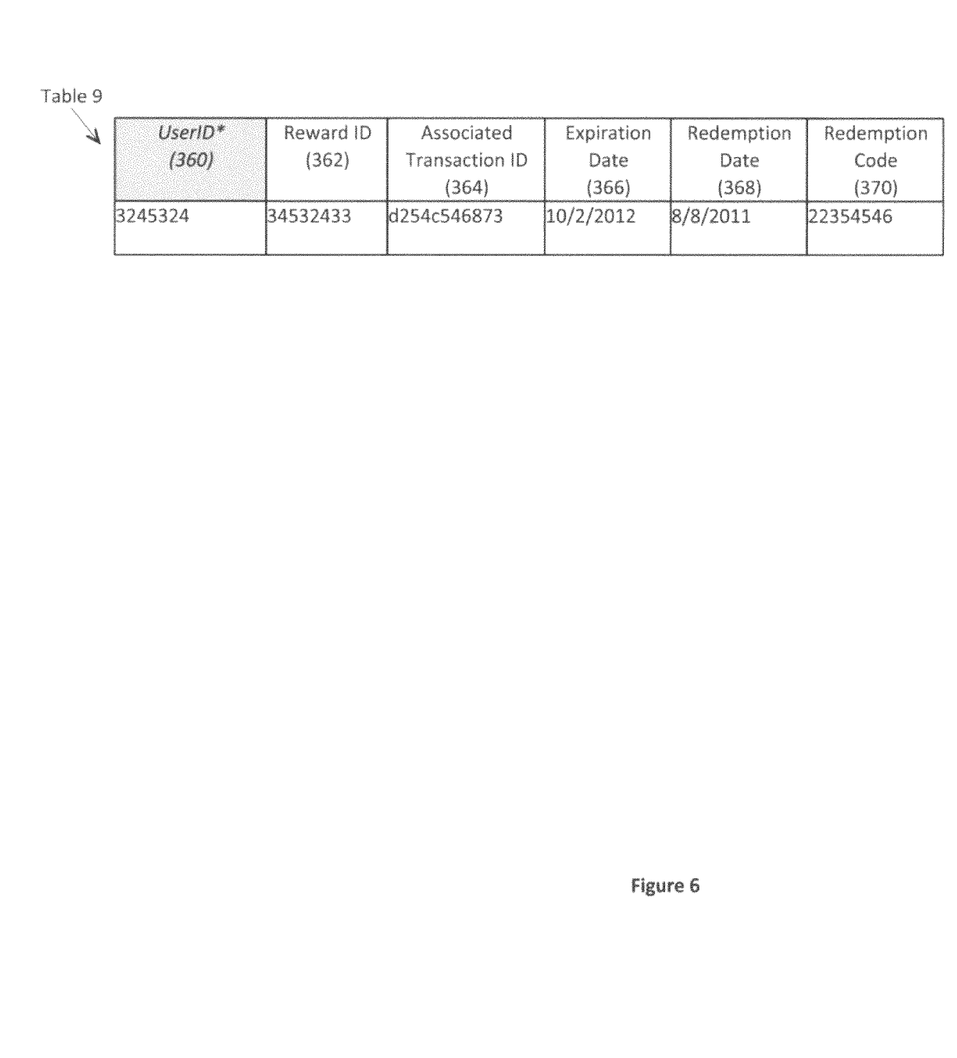
FIG. 6 is a diagram that illustrates exemplary survey participation reward redemption data.

Shown in FIG. 6 is Table 9, which includes exemplary survey participation reward redemption data that is stored in a data storage module. Table 9 includes UserID information 360, survey participation reward identification information 362, survey response transaction identifier information associated with the survey response that triggered issuance of the survey participation reward 364, survey participation reward expiration information 366, survey participation reward redemption timestamp information 368, and information which identifies a redemption entity 370.

Returning to FIG. 2, data storage module 212 is adapted to include or have access to the data structures, databases, and data tables associated with the storage of survey system data described and suggested herein, some of which is illustrated in Tables 1 through 9. In one embodiment, data storage module 212 may include or make use of a commercially available database system, such as Oracle. In any event, data storage module 212 may utilize a variety of physical storage mediums to provide, the described functionality including, but not limited to, magnetic storage media and optical storage media. In one embodiment, at least a portion of reporting and data storage functionality may be provided by external servers and/or data storage backend platforms. For example, reporting module 206 may communicate and interoperate with an external, cloud-based reporting and database system, such as that provided by SalesForce.com. Likewise, in other embodiments of the present invention, the various functions described with herein with respect to server application module 202 may be distributed over one or more cloud-based application and/or database server platforms.

According to one aspect, communication module 214 is adapted to facilitate communication with one or more survey client modules, as previously described herein. As such, communication module 214 is adapted to interoperate with and generally facilitate communications with survey client module 104 via survey client communication module 118. A variety of communication protocol stacks and languages may be implemented by communication module 214 within the scope of this invention, including but not limited to, transmission control protocol/Internet protocol (TCP/IP), user datagram protocol/Internet protocol (UDP/IP), Extensible Markup Language (XML), Hypertext Markup Language (HTML), Simple Object Access Protocol (SOAP), Session Initiation Protocol (SIP), etc.

According to another aspect, communication module 214 is adapted to facilitate communication with a client or user entity via a communication interface other than survey client-based communication module 118. For example, communication module 214 is adapted to facilitate communications with a WEB browser (e.g., Chrome, Internet Explorer, Fire- Fox, etc.). Such WEB browser interface support may be used, for example, by a client or user entity to provision survey system information.

Figure 7:
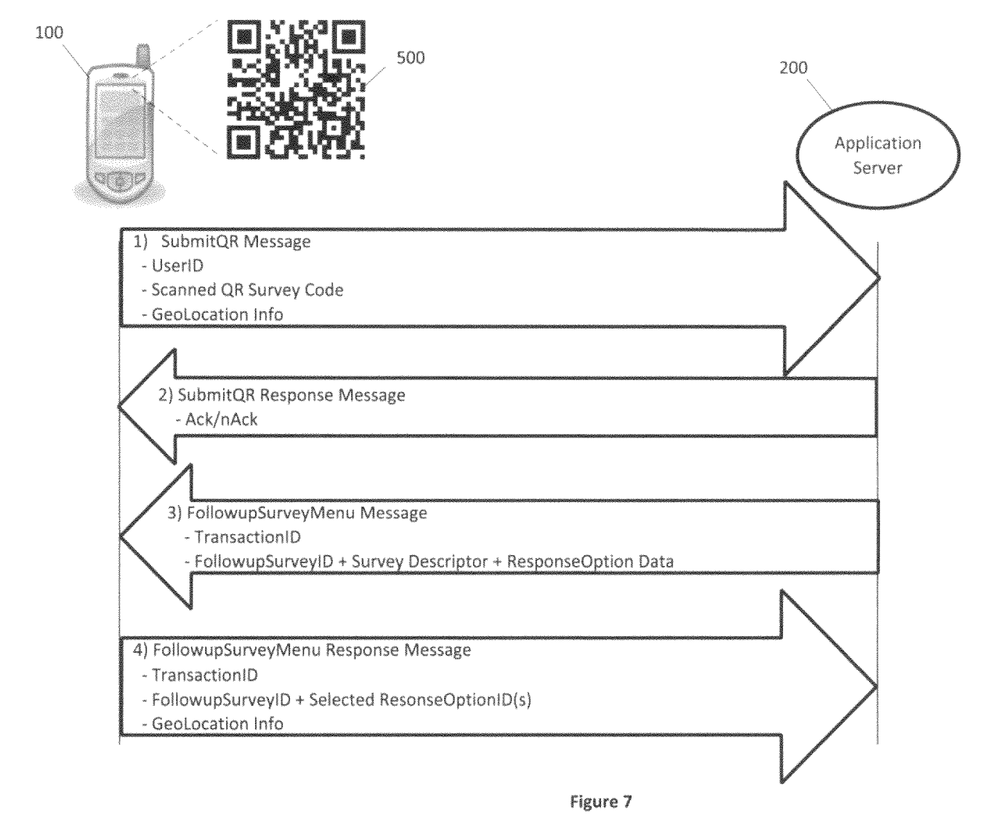
FIG. 7 is an information flow diagram that illustrates an exemplary scan-able survey transaction and an associated follow-up survey transaction.
Figure 8:
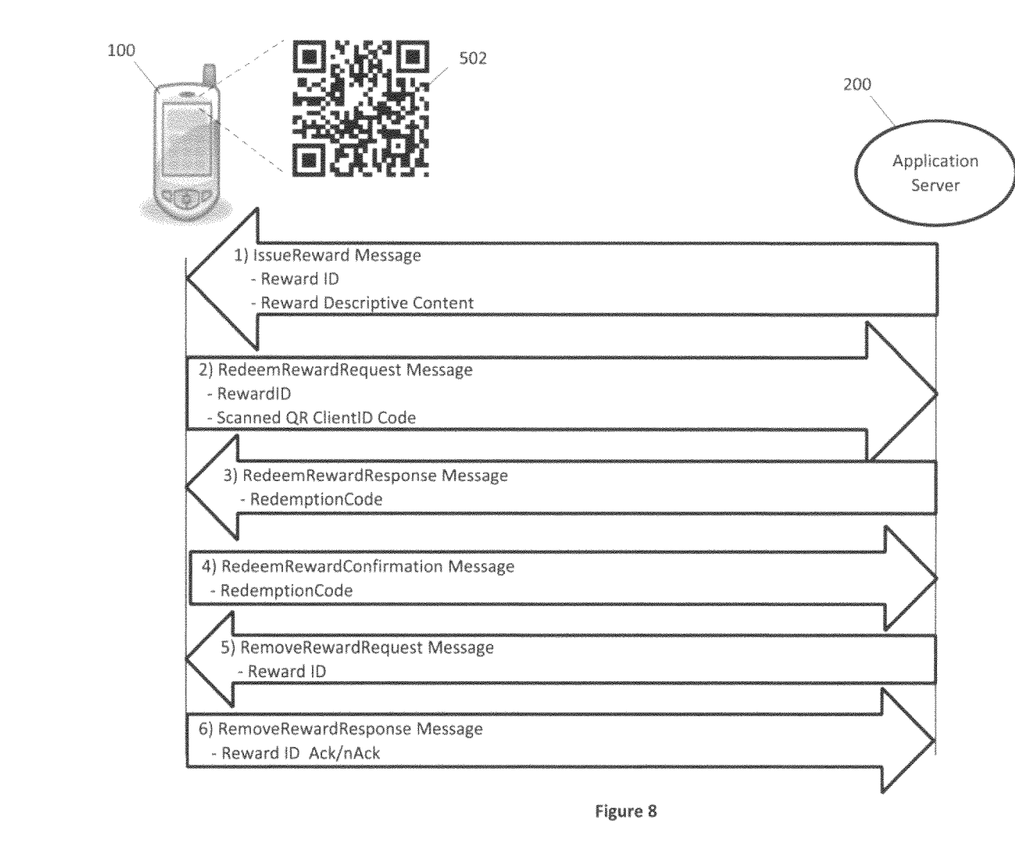
FIG. 8 is an information flow diagram that illustrates an exemplary distribution of a survey participation reward and associated reward redemption processing.
Figure 9:
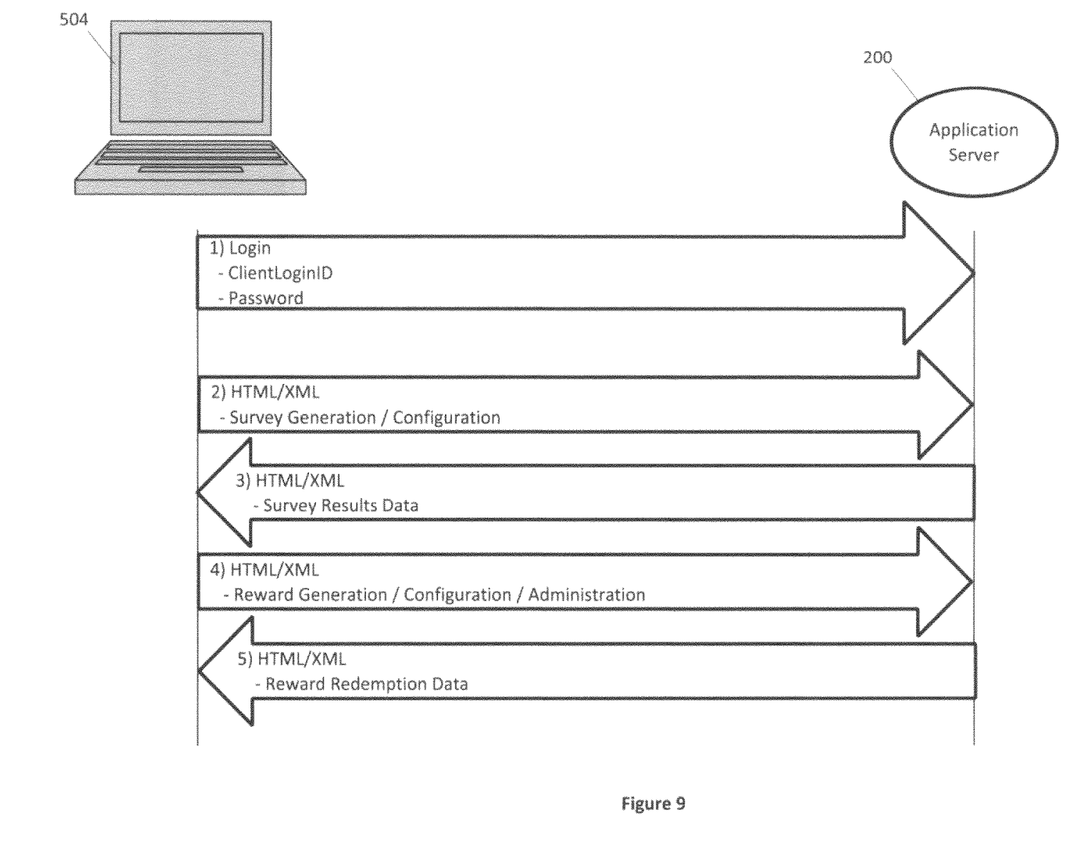
FIG. 9 is an information flow diagram that illustrates exemplary provisioning and data reporting transactions.

FIGS. 7 through 9 present various exemplary communication/signaling scenarios that may be associated with embodiments of the present invention. These communication scenarios are not intended to represent all possible information communication scenarios, and are instead merely illustrative in nature.

FIG. 7 includes mobile communication device 100 (e.g., smartphone), which includes a camera module and a survey client module previously described herein. Also included is application server 200, which includes a server application module previously described herein. In the exemplary scenario illustrated, smartphone 100 runs, executes, or activates the survey client module residing on the device. A user of smartphone 100 navigates within the survey client module menu structure so as to reach a point where the user is prompted to use the associated camera module to scan a survey QR code icon 500. In this example, survey QR code icon encodes information that identifies a client entity (i.e., Luigi's Pizzeria: ClientID=001) and a survey response (i.e., "Service Was Poor": Code 111). The scanned QR code icon is decoded, yielding the code "001111". The code "001111", along with current geo-location coordinate information (i.e., Long, Lat, Elev) and information that identifies the user is communicated to application server 200 via SubmitQR message 1. Application server 200 acknowledges receipt of the SubmitQR message with a SubmitQR Response message 2. Application server 200 logs the scanned survey response information provided by the user, and in this example, provides follow-up survey content information in FollowupSurveyMenu message 3: FollowupSurveyMenu message 3 includes a transaction identifier, a follow-up survey identifier, a follow-up survey descriptor, and response option content. In this example, the transaction identifier is "d254c546873", the follow-up survey identifier is "001344", the follow-up survey descriptor is "How Was The Service Poor", and the response option content includes the following: ReponseOptionID=01–"Waiter Was Rude", ReponseOptionID=02–"Long Wait To Be Seated", ReponseOptionID=03–"Service Was Slow". The follow-up survey descriptor and response option content text are displayed to the user, who is permitted to select some or all of the response options. For example, the user may use touchscreen capability on the smartphone to select some or all of the displayed response options. Once selection is complete the user, via the survey client module user interface, causes the selected response option information to be communicated to application server 200 via FollowupSurveyMenu Response message 4. The FollowupSurveyMenu Response message includes transaction identifier information, the follow-up survey identifier, selected response option information, and current geo-location coordinate information (i.e., Long, Lat, Elev). In this example, the transaction identifier is "d254c546873", the follow-up survey identifier is "001344", the selected response option content includes the following: ReponseOptionID=01–"Waiter Was Rude", and current geo-location information includes current Long., Lat., Elev. coordinates. Application server 200 logs the follow-up survey selected response option information provided by the user. It will be appreciated that application server 200 could provide additional follow-up survey content information via additional FollowupSurveyMenu messages, thereby progressively soliciting more and more specific or targeted feedback from the user following the initial QR code scan by the user. The ability to progressively focus the survey content presented to a user following the scanning of a more general QR code-based feedback icon is one of several advantages of the present invention.

FIG. 8 includes mobile communication device 100 (e.g., smartphone), which includes a camera module and a survey client module previously described herein. Also included is application server 200, which includes a server application module previously described herein. In the exemplary scenario illustrated, smartphone 100 runs, executes, or activates the survey client module residing on the device. In this operational scenario, application server 200 determines that the user of smartphone 100 has earned or should be distributed a reward, such as a survey participation reward. This could be, for example, the result of the user providing the survey response feedback information described previously with respect to FIG. 7. In any event, application server 200 communicates an IssueReward message 1 to smartphone 100. IssueReward message 1 includes a survey participation reward identifier and descriptive content associated with the reward. In this example, the survey participation reward identifier is "34532433" and the reward descriptive content is "$2 Off Any Item." The survey client module associated with smartphone 100 receives and stores/caches the survey participation reward information and displays it on-demand to the user. In various embodiments, survey participation reward content may be either "pushed" by application server 200 (such as is described above), or "pulled" by the survey client module on smartphone 100 (i.e., the survey client module may request that reward content be sent by application server 200).

Continuing with the exemplary operational scenario presented in FIG. 8, the smartphone user navigates within the user interface menu structure provided by the associated survey client module on the smartphone so as to reach a point where the user is prompted to select the survey participation reward that is to be redeemed. Once the user has selected the reward that is to be redeemed, the user is prompted to use the associated camera module to scan a redemption QR code icon 502. In this example, redemption QR code icon encodes information that identifies the client entity with which the reward is being redeemed (i.e., Luigi's Pizzeria: ClientID=001). The client entity with which the reward is being redeemed is also referred to herein as the redemption entity. In other embodiments, the redemption QR code could be, for example, a randomly generated code or an arbitrary code selected and provisioned by or for the redemption entity. The scanned redemption QR code icon is decoded, yielding the code "001". The code "001", along with the selected survey participation reward identification information RewardID=34532433 are communicated to application server 200 via RedeemRewardRequest message 2. Application server 200 acknowledges receipt of the RedeemRewardRequest message with a RedeemRewardResponse message 3. The ReedemRewardResponse message includes a redemption authorization code, "22354546", which is displayed to the user. In practice, the redemption entity asks to view the redemption authorization code so as to verify that the reward is valid and has been processed by/is considered redeemed by application server 200. The messaging scenario shown in FIG. 8 assumes that the user takes an action that signals application server 200 with a ReedemRewardConfirmation message, which confirms that the redemption authorization code has been received and used, and at this point the application server 200 considers the reward to have been successfully redeemed/used. However, embodiments of the present invention may be implemented that do not require such ReedemRewardConfirmation message signaling from the user in order to complete the redemption transaction. In this embodiment, application server 200 considers the redemption transaction complete when the redemption authorization code (i.e., message 3) is successfully received by the survey client module on the smartphone. Once the redemption transaction is complete, application server 200 signals the survey client module on smartphone 100 with a RemoveRewardRequest message 5, which causes the survey participation reward content associated with the redeemed reward (i.e., RewardID=34532433) to be either marked as "redeemed" or deleted from the smartphone. For example, the reward content associated with RewardID=34532433 is deleted from the survey client data storage module and RemoveRewardResponse message 6 acknowledging the deletion is generated and sent from smartphone 100 to application server 200.

FIG. 9 illustrates an exemplary provisioning and report access scenario. FIG. 9 includes a communication terminal 504, such as a personal computer, tablet computer, netbook computer, laptop computer, mobile computing device, or smartphone that is capable of communicating with application server 200. In one embodiment, communication with application server 200 may be accomplished via a WEB browser client (e.g., Chrome, Internet Explorer, FireFox) running or executing on communication terminal 504. Communication terminal 504 may utilize a data network (e.g., public Internet, wide area network, mobile data network) to facilitate communication with application server 200. In this example, a client entity invokes a WEB browser on communication terminal 504 and directs the WEB browser to a uniform resource locator (URL) associated with a server application module hosted on application server 200. The client entity submits login credentials, including a username and password via a system Login message 1. Client entity is then able to access, provision and configure survey content via message 2. Client entity may request and receive reports associated with survey content and survey response data via message 3, which may be generated and sent from application server 200. Client entity is able to use this provisioning interface to configure and administer survey participation reward content via message 4. Client entity may request and receive reports associated with survey participation reward distribution and redemption data via message 5, which may be generated and sent from application server 200.

Coupon Distribution Algorithms

With further regard to the distribution of rewards, it will be appreciated that Reward Control Logic Module 210 may employ various algorithms for specifying the number, type and frequency of reward distribution to users. For example, in one embodiment of the present invention, a new user may be given a reward after submitting a single survey response, whereas a long-time user may be given a reward only after providing multiple survey responses. In another embodiment, a long-time user who has become inactive and not provided survey responses for a prescribed period of time (e.g., has not provided any survey feedback for 2 months) may be given a reward after submitting a single survey response as a means for encouraging use/participation. In other scenarios, reward distribution frequency to a user may be increased (or decreased) as the user increases their frequency of participation.

Detection of Disingenuous Survey Response Feedback

In one embodiment of the present invention, survey control logic module 208 includes logic that is adapted to monitor responses received from a user and to analyze these responses over time to determine whether the user is attempting to flood the system with minimally useful or disingenuous survey response information. For example, a user may scan multiple survey response QR codes for the same merchant within a short time interval in the hopes of receiving a large number of rewards. Such disingenuous survey responses are counterproductive both from a reward issuance perspective and a qualitative/aggregate survey response statistics perspective (i.e., such frivolous responses do not provide the merchant with meaningful feedback, and make the interpretation of valid responses more difficult). Survey control logic module 208 may employ one or more survey response profiling algorithms to determine whether a user has provided disingenuous survey response information. One exemplary survey response profiling algorithm detects whether one or more duplicate survey response values are provided by a user within a pre-determined time period. Another exemplary survey response profiling algorithm detects whether contradictory survey response values are provided by a user within a pre-determined time period. For example, a user who provides a first survey response value of "Service was good" followed shortly by a second survey response value of "Service was bad" may be flagged as providing disingenuous survey response information. Another exemplary survey response profiling algorithm detects whether the number of survey responses provided by a user with respect to a given merchant during a prescribed time period exceeds a pre-determined threshold value.

In one embodiment, such profiling algorithms are operable to access received survey response information and associated survey response metadata. Exemplary survey response metadata may include, but is not limited to, receipt date- and time-stamp information, information that is indicative of the point-of-scan location (e.g., zipcode, city, state, GPS coordinates, etc.), survey response "demeanor" (e.g., "positive", "neutral", "negative"). With regard to survey response demeanor, it will be appreciated that such classification information may be provisioned for each possible survey response during the construction of survey content via provisioning module 204. As such, each possible scan-able survey response may be generally classified according to a particular demeanor values (e.g., "positive", "neutral", "negative"). In various embodiments of the present invention, survey control logic module 208 is adapted to access and analyze received survey response information and associated survey response metadata related to a particular user. Using such survey response information and associated survey response metadata, any number of profiling algorithms may be implemented within the scope of the present invention. As discussed previously, one profiling algorithm involves analyzing survey responses and associated metadata to determine if the number of survey responses received during a prescribed time period (e.g., 5 minutes) exceeds a threshold value. Another exemplary profiling algorithm involves analyzing survey responses and associated metadata to determine if the number of survey responses received during a prescribed time period (e.g., 5 minutes) exceeds a threshold value and whether at least a portion of the received survey responses have conflicting demeanor values.

In response to determining that a user has provided disingenuous survey response information/feedback, survey control logic module 208 is adapted to take a mitigation action. Exemplary mitigation actions may include, but are not limited to, discarding those survey responses that were deemed to be disingenuous, marking or flagging those survey responses that were deemed to be disingenuous and storing them in data storage module 212, communicating with reporting module 206 and/or reward control logic module 210 (e.g., via the marking or flagging described previously) so that the disingenuous survey responses are not reported or rewarded.

A warning message may also be sent to the offending user and/or the user's account may be suspended or terminated.

Use of QR Code & Cookie to Open Reward Wallet

A special purpose "reward redemption" scan-able code (e.g., QR code) may be generated by provisioning module 204. The reward redemption QR code may include information which is received and interpreted by one or more modules associated with the scan-able survey system of the present invention as a request to display survey participation reward information so that it may be viewed and/or redeemed. For example, the reward redemption QR code icon may include or incorporate a reward redemption command code value (e.g., alphanumeric code) which is resolved and interpreted by the scan-able survey system of the present invention as an instruction to display available survey participation reward information to the user who scans the reward redemption QR code. When scanned by scan-able code reader module 106, the reward redemption command code value incorporated within the reward redemption QR code is extracted and triggers the display of available survey participation reward information to the scanning user. In one embodiment, the filtering and displaying of rewards in the user's reward wallet may be facilitated, at least in part, by reward control logic module 114 and data storage module 116. In another embodiment, the filtering and displaying of rewards in the user's reward wallet may be facilitated, at least in part, by reward control logic module 210 and data storage module 212.

The reward redemption QR code may also include information which identifies a survey client (e.g., business or merchant). The act of scanning the special purpose reward redemption QR code causes the Survey Client Module 104 on the user's mobile device to display the user's rewards/reward wallet. If the scanned reward redemption QR code includes information which identifies a survey client, the specific reward(s) displayed to the user may be those associated with the specified business or merchant. According to one embodiment, when the reward redemption QR code is scanned by Survey Client Module 104, a previously generated cookie (or other login credential data structure/file) that includes user login credentials is accessed. The login credentials may be used to automatically log the user in to an interface (e.g., AAA interface function within communication module 214) associated with Server Application Module 202, so that rewards may be displayed and/or redeemed by the user. In another embodiment, the login credentials may be used to automatically log the user in to an interface associated with Survey Client Module 104, so that rewards may be displayed and/or redeemed by the user.

In cases where the scanned reward redemption QR code includes information which identifies a survey client, the survey client identifying information (e.g., a survey client ID) obtained from the reward redemption QR code scan may be used to select and display those rewards within the user's reward "wallet". In one embodiment, the filtering and displaying of rewards in the user's reward wallet may be accomplished, at least in part, by reward control logic module 114 and data storage module 116. In another embodiment, the filtering and displaying of rewards in the user's reward wallet may be accomplished, at least in part, by reward control logic module 210 and data storage module 212.

Scan Triggered Immediate Notification

In one embodiment of the present invention, survey content provisioning module 204 is adapted to permit the association of an immediate notification trigger (INT) with a particular survey response value, such that when the survey response value is received from a user the associated immediate notification trigger is fired. Associated with each INT is a notification message, a notification mode, and a notification contact address. An exemplary notification message may include a text descriptor associated with the triggering survey response value (e.g., "Restrooms are not clean") or a voice recording of an alert message. Exemplary notification modes may include, but are not limited to, text message, instant message, short message service, tweet, email, and voice call. Exemplary notification contact address information may include, but is not limited to, a mobile subscriber ISDN (MSISDN), a mobile telephone number, an email address, an online user identifier, a uniform resource identifier (URI), a session initiation protocol (SIP) URI, a telephone number, an Internet protocol address, and a Twitter address. In one embodiment, survey control logic module 208 includes logic that is adapted to monitor responses received from a user and to determine if a received survey response value fires an INT. In response to determining that an INT should be fired, module 208 generates the INT-specified notification message and transmits or causes the notification message to be transmitted to the specified notification contact address. It will be appreciated that more than one notification contact address may be associated with an INT, and consequently multiple notification messages may be generated in response to the firing of a single trigger.

Survey Response Analytics

According to one aspect of the present invention, survey control logic module 208 includes logic that is adapted to monitor and record survey responses received from a user, where each survey response is associated with a survey client (e.g., merchant or business). Each survey client is classified according to a pre-defined classification framework. For example, survey client X may be classified as "Restaurant: Table Service: Italian", survey client Y may be classified as "Physician:Family Practitioner", etc. Geo-location information (e.g., zip code, city, state, GPS coordinates) for each survey client is maintained/accessible by survey control logic module 208. Using this information, module 208 is adapted generate a usage profile for the user which reflects survey client usage/patronage patterns. For example, over time, module 208 may monitor and record/store (via data storage module 212) 100 survey responses that are provided by the user, where each response (and associated metadata) is associated with a survey client. Module 208 includes logic that is adapted to analyze the 100 survey responses and determine that the user has repeatedly visited/patronized survey client X and survey client Y in the past 3 months. Based on this usage profile, module 208 is adapted to identify another survey client that has both a similar classification to that of survey client X as well as a similar geo-location. This survey client that has both a similar classification to that of survey client X as well as a similar geo-location is referred to herein as an "introducible" survey client. As the term suggests, an introducible survey client is one that the analytics algorithm or profiling logic associated with module 208 determines may be of interest to the user based on the user's observed usage/patronage patterns. Module 208 may send/trigger/suggest the sending of a message to the user suggesting that the user may want to patronize the similar survey client. Exemplary message content may include, but is not limited to, an advertisement, reward, or coupon. Messages may be communicated to the user and viewed, for example, via Survey Client Module 104 or alternatively via email, text messaging service, instant messaging service, Twitter, direct mailing, or other communication means.

Reward Sharing

In one embodiment, module 210 may facilitate the sharing, gifting, or transfer of a survey participation reward from one user to another user. In this case, a first user who is the current owner of a survey participation reward, selects the reward and identifies a second user to whom the reward is to be transferred. The first user then communicates information that identifies both the reward and the "transferred to" user to module 210. The information that identifies the "transferred to" or recipient user may be a username or user ID provided by the recipient user at the time of registration by the recipient user. Module 210 receives, processes and logs the transfer request and updates the appropriate reward data so as to execute the transfer. In one embodiment, reporting module 206 enables a client entity or user to view, track and analyze such reward transfers. In various embodiments of the present invention, restrictions/limitations/qualifications may be imposed on rewards that are to be transferred or gifted from one user to another. For instance, module 210 may include reward transfer or gifting rules that specify those conditions under which a reward may be transferred and/or those conditions under which a reward may not be transferred. These rules may be stored in a database, table, or data structure that is contained within or accessible by module 210. An exemplary rule may state that a reward may only be transferred or gifted to a new user (e.g., a user that has registered for service within the past 30 days, etc.). In order to enforce this rule module 210 may access user registration data that is maintained in data storage module 212. Another exemplary rule may state that a reward may only be transferred or gifted to a user who has not previously patronized the survey client with which the reward is associated. In order to enforce this rule module 210 may access user survey response data that is maintained in data storage module 212.

In one embodiment, an existing user may transfer or gift a reward to an individual who has not yet become a registered user. To facilitate such a special transfer, the existing user communicates information that identifies both the reward and the "transferred to" or recipient user to module 210. In this case, since the recipient user is not yet a registered user of the system/service, the existing user must specify a public contact address for the intended recipient. Exemplary public contact addresses may include, but are not limited to, an email address, a mobile telephone number, a mobile subscriber ISDN (MSISDN), a Twitter address, an instant message address. Module 210 receives processes and logs the transfer request. In one embodiment, module 210 is adapted to generate a message that is addressed to the specified public contact address (e.g., email address). In one embodiment, the message may include the transferred reward or information specifying how the transferred reward may be obtained and redeemed. In another embodiment, the message may include information that describes the pending reward transfer and also provides a hyperlink/URL associated with a WEB page where the intended recipient may register and thereby receive and redeem the transferred reward. The existing user that transferred or gifted the reward (thereby resulting in the recruitment/registration of a new subscriber) may be issued a new reward as a result of the transfer. The new reward may be the same as the transferred reward or different. The new reward may be issued by reward control logic module 210.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for collecting survey response information using scan-able survey codes, the system comprising:
  a. a server application module for:
    i. receiving survey response information from a survey client module, where the survey response information is obtained by scanning a single scan-able survey response code, wherein the survey response information obtained by the scanning of the scan-able survey response code is associated with a response option to a survey question, wherein the survey response information further includes information associated with a client entity, wherein the client entity comprises a retailer or merchant of goods or services and wherein the response option is associated with an indication of quality of one of the goods or services;
    ii. storing at least a portion of the received survey response information; and
    iii. generating and reporting aggregate survey response statistics based at least in part on the received survey response information.

2. The system of claim 1 where user identifying information is also communicated to the server application module via the survey client module.

3. The system of claim 1 where survey response information includes information that identifies a location.

4. The system of claim 1 including receiving information that identifies a user associated with the received survey response information.

5. The system of claim 1 including, in response to receiving the survey response information, issuing a survey participation reward.

6. The system of claim 1 including, in response to receiving the survey response information, communicating a follow-up survey to the survey client module.

7. The system of claim 1 including, in response to receiving the survey response information, generating an immediate notification message.

8. The system of claim 1 including a scan-able survey code provisioning module for;
  a. receiving, as input, text associated with a survey response option;
  b. storing the survey response option input text;
  c. generating, a scan-able code image that includes encoded information which identifies the survey response option text and the client entity; and
  d. outputting the scan-able code image so that it may be scanned by a survey client module.

9. The system of claim 1 wherein the server application module is configured for:
  iv. utilizing the survey response code to obtain follow-up survey content relating to the response option; and
  v. sending the follow-up survey content to the survey client module.

10. A method for collecting survey response information using scan-able survey codes, the method comprising:
  a. at a server application module:
    i. receiving survey response information from a survey client module, where the survey response information is obtained by scanning a single scan-able survey response code, wherein the survey response information obtained by the scanning of the scan-able survey response code is associated with a response option to a survey question, wherein the survey response information further includes information associated with a client entity, wherein the client entity comprises a retailer or merchant of goods or services and wherein the response option is associated with an indication of quality of one of the goods or services;
  ii. storing at least a portion of the received survey response information; and
  iii. generating and reporting aggregate survey response statistics based at least in part on the received survey response information.

11. The method of claim 10 where user identifying information is also communicated to the server application module via the survey client module.

12. The method of claim 10 where survey response information includes information that identifies a survey location.

13. The method of claim 10 including receiving information that identifies a user associated with the received survey response information.

14. The method of claim 10 including, in response to receiving the survey response information, issuing a survey participation reward.

15. The method of claim 10 including, in response to receiving the survey response information, communicating a follow-up survey to the survey client module.

16. The method of claim 10 including, in response to receiving the survey response information, generating an immediate notification message.

17. The method of claim 10 including a scan-able survey code provisioning module for;
  a. receiving, as input, text associated with a survey response option;
  b. storing the survey response option input text;
  c. generating, a scan-able code image that includes encoded information which identifies the survey response option text and the client entity; and
  d. outputting the scan-able code image so that it may be scanned by a survey client module.

18. The method of claim 10 comprising:
  iv. utilizing the survey response code to obtain follow-up survey content relating to the response option; and
  v. sending the follow-up survey content to the survey client module.

19. A system for provisioning scan-able survey response information in a scan-able survey system, the system comprising:
  a. a scan-able survey code provisioning module for:
    i. receiving, as input, text associated with a survey response option to a survey question, wherein the survey response information further includes information associated with a client entity, wherein the client entity comprises a retailer or merchant of goods or services and wherein the response option is associated with an indication of quality of one of the goods or services;
    ii. storing the survey response option;
    iii. generating, a scan-able code image that includes encoded information which identifies the survey response option and the client entity; and
    iv. outputting the scan-able code image so that it may be scanned by a survey client module, wherein scanning of the scan-able code by the survey client module communicates survey response information associated with the survey response option to a server application module.

20. The system of claim 19 where the scan-able survey code image is a quick response (QR) code.

21. The system of claim 19 wherein the scan-able survey code provisioning module is configured for:
  v. utilizing the survey response code to obtain follow-up survey content relating to the response option; and
  vi. sending the follow-up survey content to the survey client module.

* * * * *